United States Patent
Long et al.

(10) Patent No.: US 7,375,921 B2
(45) Date of Patent: May 20, 2008

(54) AIR RAZOR AND DISK LIMITER FOR A HARD DISK DRIVE

(75) Inventors: Wilson Long, Santa Jose, CA (US); Woocheol Jeong, Santa Clara, CA (US); Kevin Tu, San Jose, CA (US)

(73) Assignee: Samsung Electronics Co., Ltd., Suwon (KR)

(*) Notice: Subject to any disclaimer, the term of this patent is extended or adjusted under 35 U.S.C. 154(b) by 916 days.

(21) Appl. No.: 10/857,513

(22) Filed: May 28, 2004
(Under 37 CFR 1.47)

(65) Prior Publication Data
US 2007/0274007 A1 Nov. 29, 2007

Related U.S. Application Data

(62) Division of application No. 09/884,804, filed on Jun. 18, 2001, now Pat. No. 6,762,908.

(51) Int. Cl.
*G11B 33/14* (2006.01)
(52) U.S. Cl. .................................................. 360/97.02
(58) Field of Classification Search ............ 360/97.02, 360/97.01, 97.03, 256.1, 265.6, 265.7, 266, 360/266.1
See application file for complete search history.

(56) References Cited

U.S. PATENT DOCUMENTS

| | | | | |
|---|---|---|---|---|
| 5,146,450 | A * | 9/1992 | Brooks et al. | 360/265.6 |
| 5,319,511 | A * | 6/1994 | Lin | 360/256.1 |
| 5,602,700 | A * | 2/1997 | Viskochil et al. | 360/256.1 |
| 6,337,782 | B1 * | 1/2002 | Guerin et al. | 360/256.1 |
| 6,473,271 | B1 * | 10/2002 | Rahman et al. | 360/266 |
| 6,903,899 | B2 * | 6/2005 | Sakata et al. | 360/97.03 |
| 2002/0048123 | A1 * | 4/2002 | Korkowski et al. | 360/266 |
| 2002/0149876 | A1 * | 10/2002 | Sakata et al. | 360/97.02 |
| 2007/0139815 | A1 * | 6/2007 | Takamatsu et al. | 360/97.01 |

* cited by examiner

*Primary Examiner*—Tianjie Chen
(74) *Attorney, Agent, or Firm*—Ben J. Yorks; Irell & Manella LLP

(57) ABSTRACT

A disk drive that has an air deflector which deflects at least a portion of airflow away from an actuator arm assembly of the drive. The air flow is typically generated by a rotating disk of the disk drive.

2 Claims, 2 Drawing Sheets

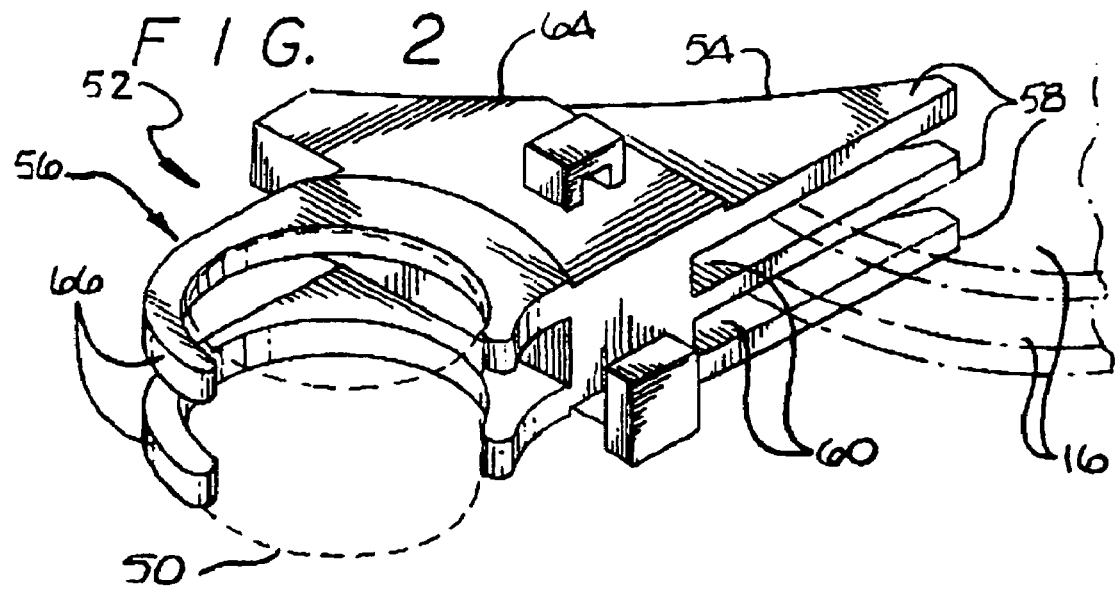
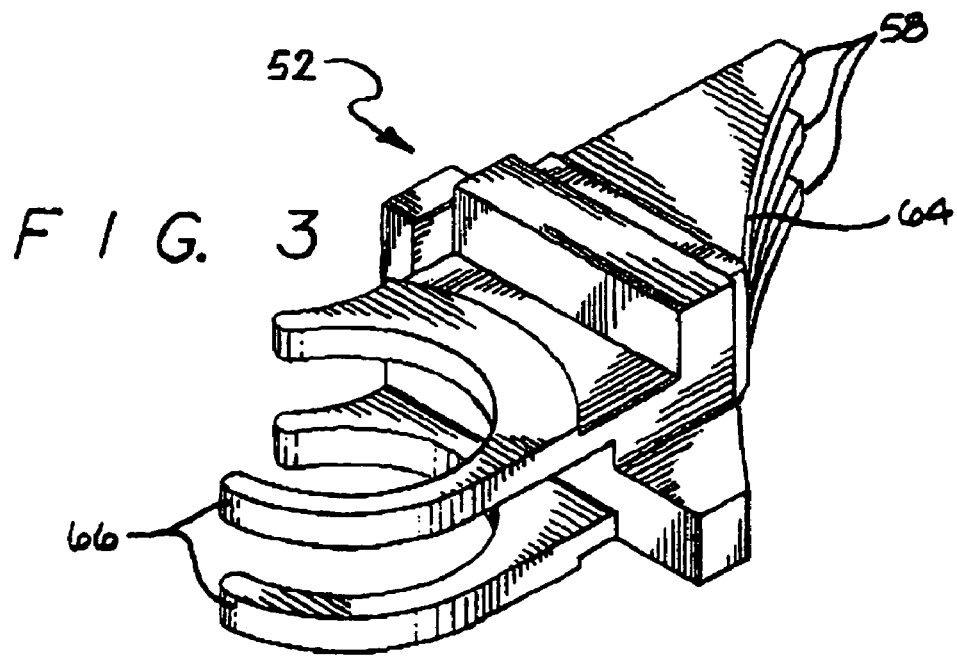

AIR RAZOR AND DISK LIMITER FOR A HARD DISK DRIVE

CROSS REFERENCE TO RELATED APPLICATIONS

This is a divisional Application of U.S. patent application Ser. No. 09/884,804 filed on Jun. 18, 2001, now U.S. Pat. No. 6,762,908.

BACKGROUND OF THE INVENTION

1. Field of the Invention

The present invention relates to a hard disk drive that has an air deflector which deflects air from an actuator arm of the drive.

2. Prior Art

Hard disk drives contain a plurality of transducers that are coupled to magnetic disks. The transducers can read and write information by magnetizing and sensing the magnetic fields of the disks, respectively. The transducers are typically integrated into a head that has an air bearing surface. The disks are rotated by a spindle motor that is mounted to a base plate.

The heads are attached to an actuator arm assembly that is mounted to the base plate. The actuator arm assembly typically includes a plurality of flexure arms that are mounted to an actuator arm. Each flexure arm supports a head and extends out across the surface of an adjacent disk. The actuator arm includes a voice coil motor that can move the transducers across the surfaces of the disks. The voice coil motor allows the transducers to access information located within different radial tracks of the disks. The disks, spindle motor and actuator arm are all enclosed by a cover that is attached to the base plate.

Rotation of the disks creates an air flow within the disk drive. The air flow cooperates with an air bearing surface of each transducer to create an air bearing between the head and the disk surface. Unfortunately, the air flow also exerts a force on the actuator arm.

It is desirable to maintain the heads on the centers of the radial data tracks. The tracks typically contain servo information used in a servo routine to locate and maintain a center position for the heads. The air flow generated by the rotating disks may move the heads and decrease the stability of the servo system and the disk drive. It would be desirable to provide a disk drive that minimizes the affects of air flow on the actuator arm and increases the stability of the drive.

BRIEF SUMMARY OF THE INVENTION

One embodiment of the present invention is a disk drive that has an air deflector which deflects at least a portion of airflow away from an actuator arm of the drive. The air flow is typically generated by a rotating disk of the disk drive.

BRIEF DESCRIPTION OF THE DRAWINGS

FIG. 2 is a top perspective view of an air deflector of the disk drive;

FIG. 3 is a bottom perspective view of the air deflector.

DETAILED DESCRIPTION OF THE PREFERRED EMBODIMENT

Figure 1:
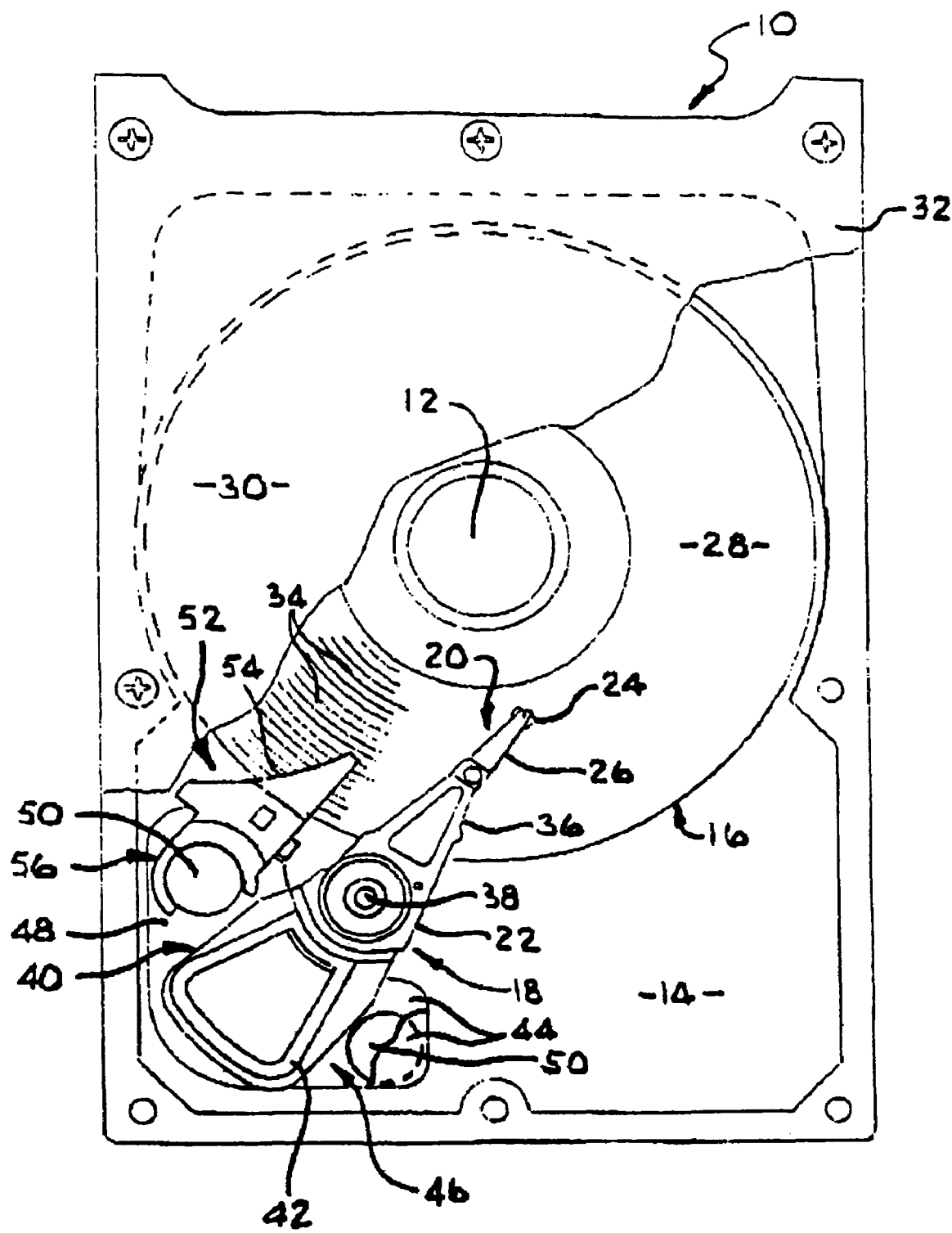
FIG. 1 is a top sectional view of an embodiment of a disk drive of the present invention.

In general the present invention is a disk drive with an air deflector that deflects air away from an actuator arm. Deflecting the air reduces the external forces on the arm and improves the stability of the disk drive.

Referring to the drawings more particularly by reference numbers, FIG. 1 shows an embodiment of a hard disk drive of the present invention. The disk drive 10 may include a spindle motor 12 that is mounted to a base plate 14. The spindle motor 12 rotates a plurality of disks 16. Rotation of the disks 16 creates a flow or air within the disk drive as is known in the art.

The disks 16 rotate relative to an actuator arm assembly 18. The actuator arm assembly 18 includes a plurality of head gimbal assemblies 20 that are attached to an actuator arm 22. Each head gimbal assembly 20 may include a head 24 that is gimbal mounted to a suspension arm 26. Each head 24 is magnetically coupled to a disk surface 28. The disks 16 and actuator arm assembly 18 may be enclosed by a cover plate 30 that is attached to the base plate 14. The cover 30 and base 14 plates form a disk drive housing 32.

Each head 24 may include a write element (not shown) and a read element (not shown) that are coupled to an electronic circuit(s) (not shown). The circuit and read/write elements can magnetize and sense the magnetic field of each disk surface 28 to store and retrieve data within the disk drive. The data is typically stored within sectors that extend along annular tracks 34 of the disks 16.

Each head 24 typically includes an air bearing surface that cooperates with the air flow created by the rotating disks 16 to create an air bearing between the head 24 and the disk surface 28. The air bearing prevents contact and wear between the disks 16 and the heads 24.

The actuator arm 22 may include a plurality of individual arms 36 that are separated by slots (not shown) which allow the disks 16 to spin between the arms 36. The actuator arm 22 may be pivotally mounted to the base plate 14 by a bearing assembly 38.

The actuator arm 22 may further have a voice coil portion 40 that supports a voice coil 42. The voice coil 42 may be coupled to a magnet assembly 44 and a driver circuit (not shown). The coil 42 and magnet assembly 44 are commonly referred to as a voice coil motor 46. When excited by the driver circuit the voice coil 42 cooperates with the magnet assembly 44 to create a torque that rotates the actuator arm 22 relative to the base plate 14. The pivotal movement of the actuator arm 22 moves the heads 24 across the disk surfaces 28 to access different tracks of the disks 16.

The magnet assembly 44 may include a pair of magnets 48 that are separated by posts 50. The posts 50 mount the assembly 44 to the base plate 14 and create a space for the voice coil 42 to move between the magnets 48.

It is desirable to maintain each head 24 on the center of an adjacent data track. Each track typically contains servo bits that are utilized as part of a servo routine to locate and maintain the heads over the track centerlines. The air flow created by the rotating disks 16 may exert forces on the actuator arm 22. These forces decrease the stability of the servo system of the drive 10.

The drive 10 of the present invention includes an air deflector 52 that deflects at least a portion of the air flow generated by the disks 16 away from the actuator arm 22. The deflector 52 may include a deflector portion 54 that extends from a mounting portion 56.

Referring to FIGS. 2 and 3, the deflector portion 54 may include a plurality of fingers 58 that extend over portions of the disks 16. The fingers 58 may be separated by slots 60 that provide clearance for the disks 16. Each finger 58 may have a triangular shape with a slanted edge 64 that redirects the airflow toward the center of the disks 16. The fingers 58 may be located a predetermined distance above an adjacent disk 16 so that air can flow to the heads 24 and create the air bearings while still redirecting air away from the actuator arm 24.

The mounting portion 56 may include a pair of C shaped fingers 66 that are snapped onto one of the magnet posts 50 of the magnet assembly 44. The deflector portion 54 and mounting portion 56 may be one integrally molded plastic part. The plastic deflector provides a relatively low cost part that can be integrated into existing disk drive designs and assemblies.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for assembling an air deflector to a hard disk drive for deflecting air within a disk drive, comprising:
    snapping a C-shaped finger of an air deflector onto a magnet post of a voice coil motor.

2. The method of claim 1, wherein the air flow is directed toward a center portion of a disk.

* * * * *